(12) United States Patent
Takeuchi et al.

(10) Patent No.: US 8,727,428 B2
(45) Date of Patent: May 20, 2014

(54) FRONT PART BODY STRUCTURE OF VEHICLE

(75) Inventors: Hideki Takeuchi, Kariya (JP); Akihiro Matsui, Kariya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/612,110

(22) Filed: Sep. 12, 2012

(65) Prior Publication Data
US 2013/0062911 A1 Mar. 14, 2013

(30) Foreign Application Priority Data

Sep. 13, 2011 (JP) .................................. 2011-199270

(51) Int. Cl.
*B62D 25/08* (2006.01)
(52) U.S. Cl.
USPC .................. 296/203.02; 296/193.09; 296/205
(58) Field of Classification Search
USPC .................. 296/203.01, 203.02, 193.09, 205
See application file for complete search history.

(56) References Cited

U.S. PATENT DOCUMENTS

| 5,324,133 | A * | 6/1994 | Kreis et al. ..................... 403/270 |
| 5,868,457 | A * | 2/1999 | Kitagawa ................. 296/187.09 |
| 6,068,330 | A * | 5/2000 | Kasuga et al. ........... 296/187.09 |
| 7,140,674 | B2 * | 11/2006 | Miyoshi et al. .......... 296/203.03 |
| 7,488,022 | B2 * | 2/2009 | Belwafa et al. ................. 296/29 |
| 2005/0046237 | A1 | 3/2005 | Miyoshi et al. |
| 2008/0036243 | A1 | 2/2008 | Kanagawa et al. |

FOREIGN PATENT DOCUMENTS

| EP | 1888902 A1 | 2/2008 |
| JP | 1-309880 A | 12/1989 |
| JP | 2001-39338 A | 2/2001 |

* cited by examiner

*Primary Examiner* — Dennis H Pedder
(74) *Attorney, Agent, or Firm* — Birch, Stewart, Kolasch & Birch, LLP.

(57) ABSTRACT

A front part body structure of a vehicle, includes: an upper frame which is extended in a longitudinal direction of the vehicle, one end of which is joined to a front pillar, and which includes an inner panel and an outer panel, the outer panel that is divided in a dividing part in the longitudinal direction of the vehicle; and a first partition wall which is provided between the inner panel and the outer panel, one end of which is joined to the inner panel, and the other end of which is fastened and fixed to the dividing part of the outer panel by means of a fastening member.

6 Claims, 6 Drawing Sheets

FRONT PART BODY STRUCTURE OF VEHICLE

BACKGROUND OF THE INVENTION

1. Field of the Invention

The present invention relates to a front part body structure of a vehicle, and more particularly, to a joining structure of an upper frame.

2. Description of the Related Art

In many front part body structures of vehicles, an engine room is generally provided in front of a cabin. A front part of the vehicle containing the engine room is provided with front side members which are positioned at right and left sides in a lateral direction of the vehicle, a plurality of cross members which are bridged between the front side members, suspension support panels which are joined to the front side members, and upper frames which are fixed to front pillars constituting the cabin side, at their one ends. Upper parts of struts which function as input parts from a front suspension of a strut type to a vehicle body are respectively fixed to the right and left suspension support panels by means of bolts, thereby to form strut houses.

The upper frames which are positioned at the right and left sides in the lateral direction of the vehicle are extended in a longitudinal direction of the vehicle, and formed in a closed sectional structure having their respective inner panels joined and fixed to the strut houses, and their respective outer panels superposed on and joined to the inner panels. In each of the upper frames, one end of the outer panel is joined to the front pillar by arc welding, and thus, joining rigidity is secured. At the same time, the other end of the outer panel is connected to a radiator bracket and so on which are positioned at the front side of the vehicle. JP-A-2001-39338 discloses a joining structure of the upper frame of this type.

Although the upper frame in the related art is advantageous in that the rigidity can be obtained, because the upper frame is joined to the front pillar at its one end by arc welding, it is difficult to maintain quality such as positional accuracy. Moreover, an arc-welded part of the upper frame bears a load from the front suspension in a vertical direction of the vehicle, because the arc-welded part is positioned in a rear part of the vehicle than the strut house which functions as the input part from the front suspension to the vehicle body, and the upper frame itself is connected to the strut house. For this reason, in case where the rigidity of the upper frame against the load in the vertical direction of the vehicle is weak, steering performance may be badly affected. Therefore, for the purpose of enhancing driving feeling of the vehicle, it is necessary to secure the rigidity of the upper frame.

SUMMARY OF THE INVENTION

This invention provides a front part body structure of a vehicle in which maintenance of quality such as positional accuracy can be stabilized, while fitting rigidity of an upper frame is secured.

An aspect of the invention provides a front part body structure of a vehicle, the front part body structure comprising: an upper frame which is extended in a longitudinal direction of the vehicle, one end of which is joined to a front pillar, and which includes an inner panel and an outer panel, the outer panel that is divided in a dividing part in the longitudinal direction of the vehicle; and a first partition wall which is provided between the inner panel and the outer panel, one end of which is joined to the inner panel, and the other end of which is fastened and fixed to the dividing part of the outer panel by means of a fastening member.

The front part body structure may further comprise a second partition wall which is provided at a front side of the vehicle than the first partition wall, and one end of which is joined to the inner panel. The divided outer panel may include a front outer panel and a rear outer panel. The front outer panel may be fixed to the second partition wall. A rear end of the rear outer panel may be joined to the front pillar, and a front end of the rear outer panel may be joined to a rear end of the front outer panel and be fastened and fixed to the first partition wall by means of the fastening member.

The rear end of the front outer panel and the front end of the rear outer panel may be superposed on each other and be fastened and fixed to the first partition wall by means of the fastening member.

At least one of the first partition wall and the second partition wall may be joined to a suspension support panel which is positioned inward of the vehicle than the inner panel and on which a suspension is mounted, through the inner panel.

A wall thickness of the rear outer panel may be larger than a wall thickness of the front outer panel.

DETAILED DESCRIPTION OF THE INVENTION

Figure 1:
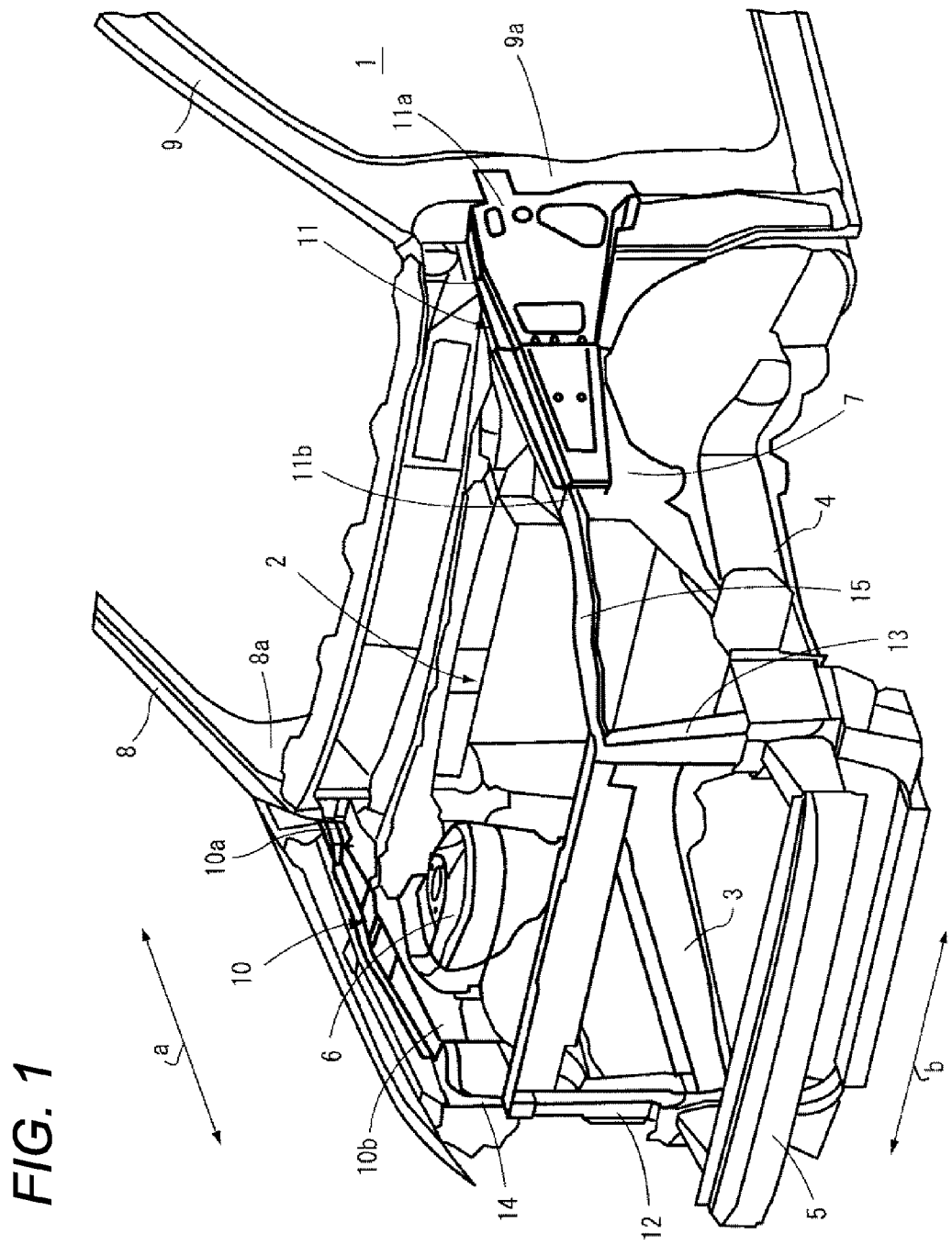
FIG. 1 is a perspective view showing a front part body structure of a vehicle in an embodiment according to the invention.

Now, referring to the drawings, an embodiment according to the invention will be described. In a front part body structure of a vehicle as shown in FIG. 1, an engine room 2 is positioned in front of a cabin 1. A front part of the vehicle containing the engine room 2 includes right and left front side members 3, 4 which are positioned in a lateral direction b of the vehicle as shown by a bidirectional arrow mark, a front end cross member 5 which is bridged between respective front ends of the front side members 3, 4, suspension support panels 6, 7 which are respectively joined to the front side members 3, 4, and upper frames 10, 11. One ends 10a, 11a of the upper frames 10, 11 are fixed to front pillars 8, 9 which are positioned in the lateral direction b of the vehicle to form the cabin side, and the other ends 10b, 11b of the upper frames 10, 11 are connected to head lamp brackets 14, 15 which are extended from radiator mount brackets 12, 13 which forma front part structure of the vehicle.

Respective pairs of the suspension support panels 6, 7, the front pillars 8, 9, and the upper frames 10, 11 have the same structures, except that these members are provided at the right and left sides of the vehicle. Therefore, the structure of the left side of the vehicle will be described hereunder, as a representative example.

Figure 2:
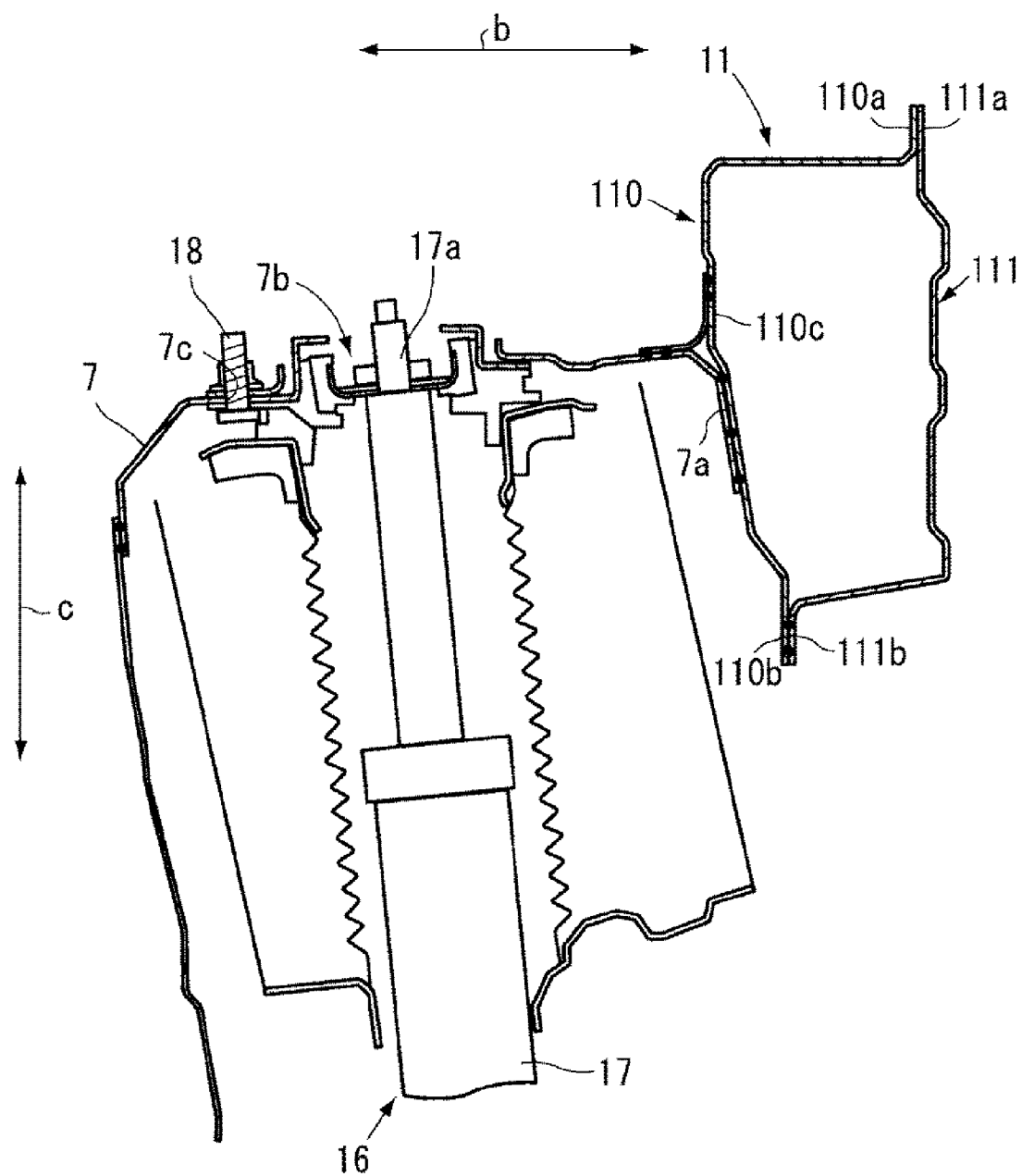
FIG. 2 is a sectional view of an upper frame and a suspension support panel in a connected state, as seen from a front side of the vehicle.

As shown in FIG. 2, the suspension support panel 7 is provided with a strut fitting part 7b to which an upper part 17a of a strut 17 is fitted. The strut 17 functions as an input part from a front suspension 16 of a strut type to the vehicle body. A plurality of bolt fitting holes 7c into which fitting bolts 18 are inserted are formed around the strut fitting part 7b. It is to be noted that only one of the bolt fitting holes 7c is shown in FIG. 2. The upper part 17a of the strut 17 is fixed to the strut fitting part 7b by inserting the fitting bolts 18 into the bolt fitting holes 7c. In short, the suspension support panel 7 constitutes a strut house.

Figure 3:
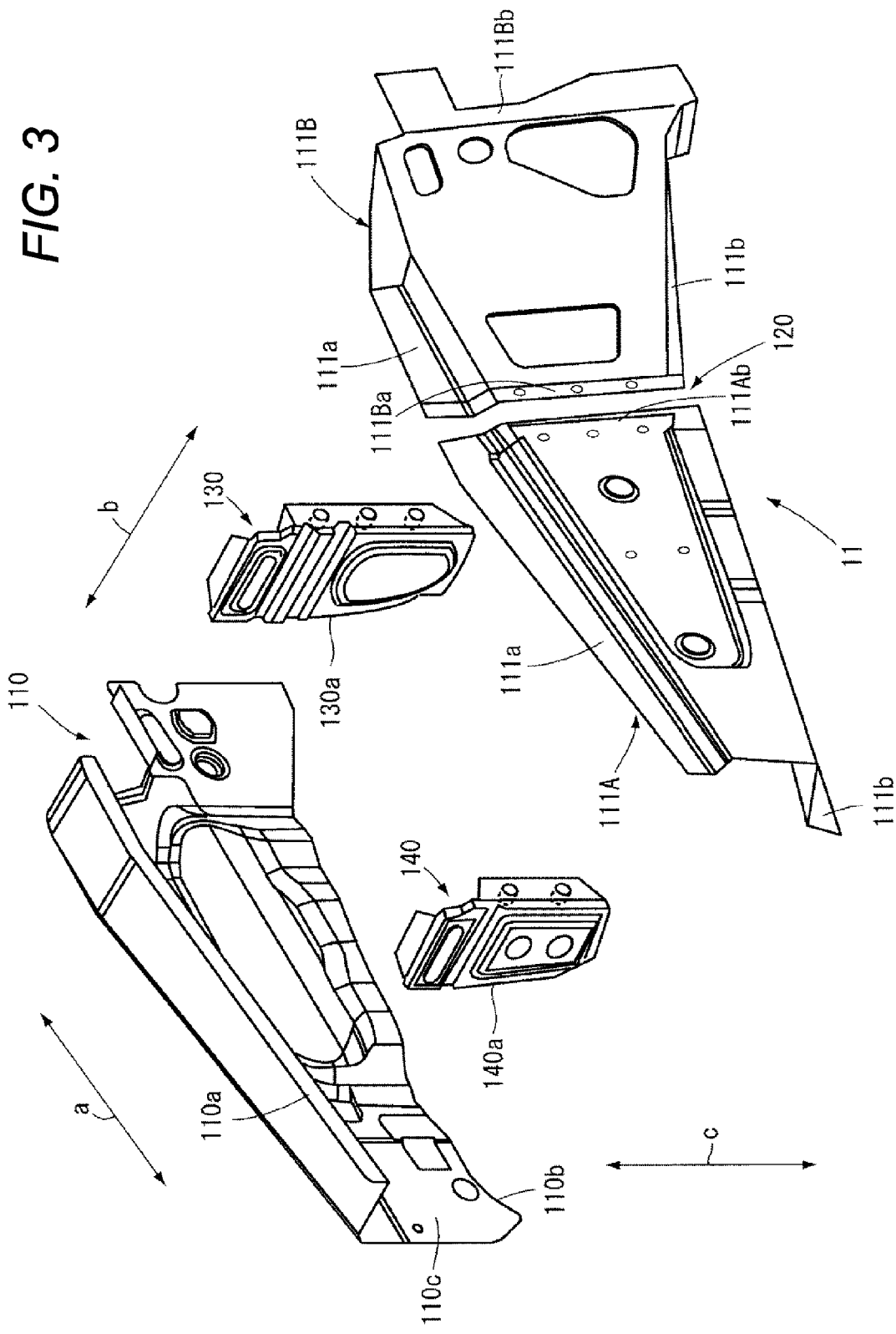
FIG. 3 is an exploded perspective view showing a structure of the upper frame.

As shown in FIGS. 1 and 3, the upper frame 11 extends so as to increase its sectional area in a longitudinal direction of the vehicle which is shown by a bidirectional arrow mark a. As shown in FIG. 2, the upper frame 11 includes an inner panel 110 which is joined and fixed to the suspension support panel 7, and an outer panel 111 which is superposed on and joined to the inner panel 110. The inner panel 110 and the outer panel 111 are respectively provided with upper and lower joining flanges 110a, 110b, and upper and lower joining flanges 111a, 111b. The joining flange 110a and the joining flange 111a are joined to each other, and the joining flange 110b and the joining flange 111b are joined to each other, and they are subjected to spot welding, thereby to be integrally formed into a closed sectional structure.

A side face 110c of the inner panel 110 which is positioned between the joining flange 110a and the joining flange 110b is joined to a side face 7a of the suspension support panel 7, and fixed by welding or so. In this manner, the inner panel 110 is integrally fitted to the suspension support panel 7. Generally, the suspension support panel 7 is formed having a higher rigidity than the upper frame 11, because a load in a vertical direction of the vehicle which is shown by a bidirectional arrow mark c is inputted from the strut 17 to the suspension support panel 7, while the vehicle is running. Fitting rigidity of the inner panel 110 is enhanced, because it is fixed to the suspension support panel 7 having this high rigidity.

Figure 4:
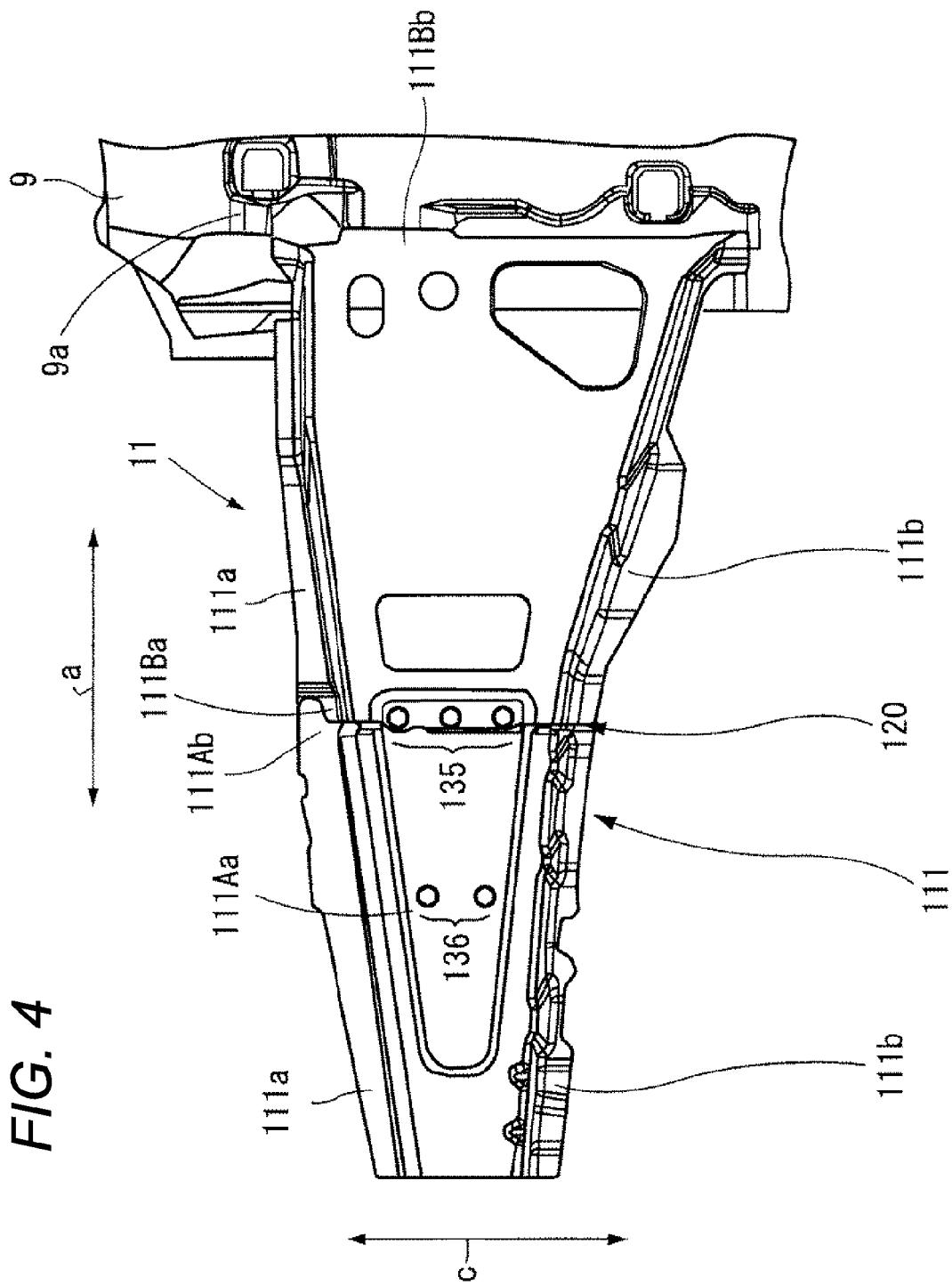
FIG. 4 is a side view showing the structure of the upper frame which is a characteristic part of the invention.

As shown in FIGS. 3 and 4, the outer panel 111 in this embodiment is divided in two, in a dividing part 120, in the longitudinal direction a of the vehicle, and the dividing part 120 is fastened and fixed to a first partition wall 130 which is positioned between the inner panel 110 and the outer panel 111, by means of a plurality of bolts 135 which function as fastening members. A second partition wall 140 is provided between the inner panel 110 and the outer panel 111 at a front side of the vehicle than the first partition wall 130, as shown in FIG. 3.

Figure 5:
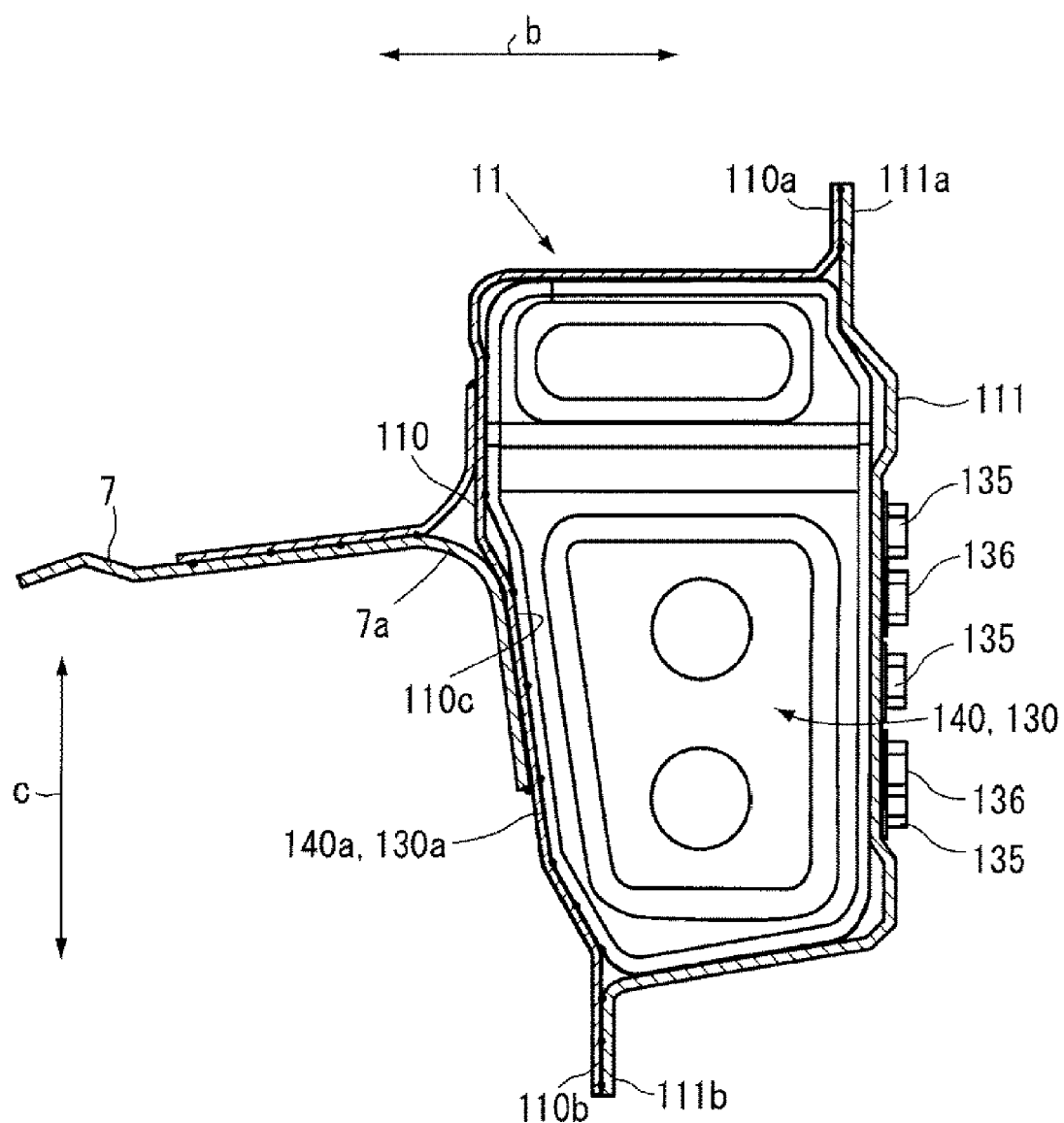
FIG. 5 is a sectional view of a part of the upper frame provided with partition walls, as seen from the front side of the vehicle.
Figure 6:
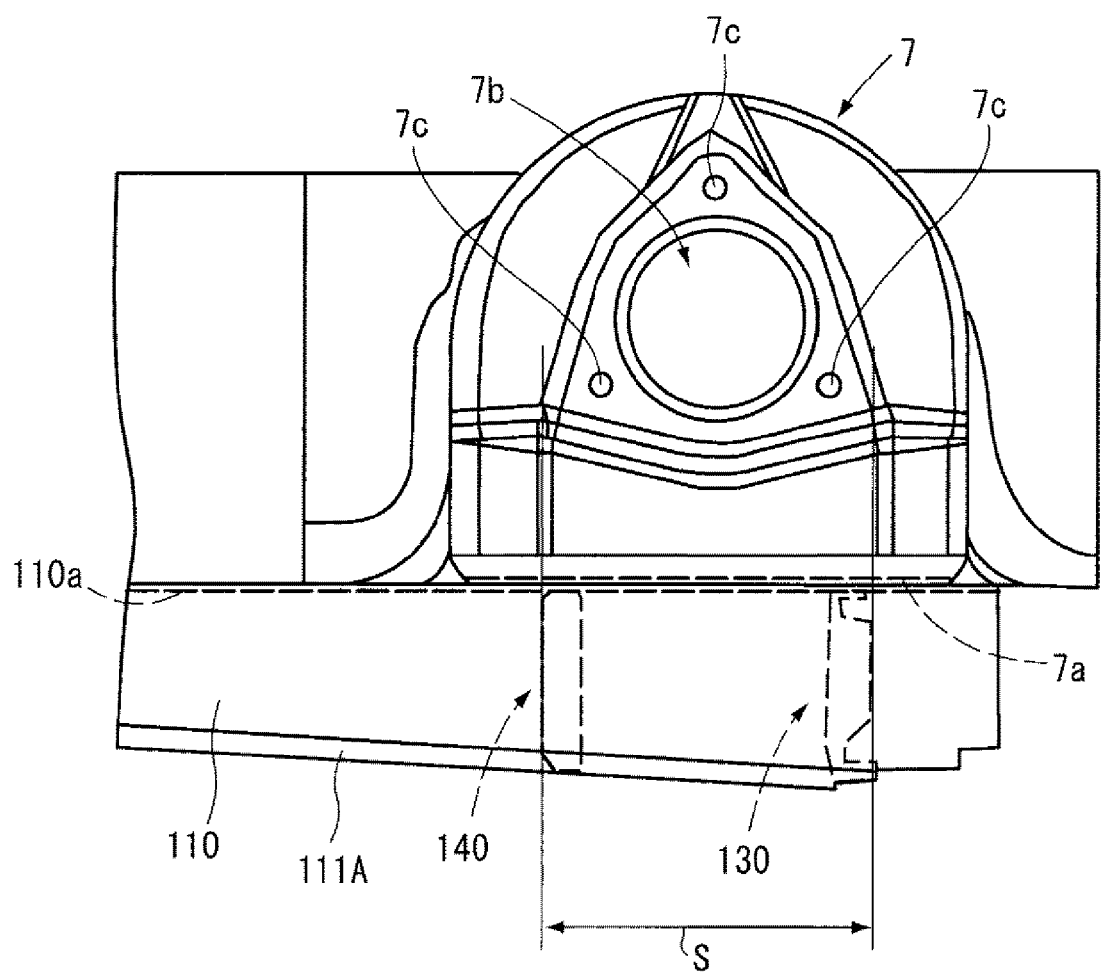
FIG. 6 is a sectional view of the part of the upper frame provided with the partition walls, as seen from the above of the vehicle.

Respective front faces of the first partition wall 130 and the second partition wall 140 are formed in a similar shape to a sectional shape of the upper frame 11 which is formed by joining the inner panel 110 and the outer panel 111, as seen from the front side. Respective one side faces 130a and 140a of the first and second partition walls 130, 140 are fixed to the side face 110c of the inner panel 110 by welding, for example. As shown in FIG. 6, the first partition wall 130 and the second partition wall 140 are arranged at such positions that the strut fitting part 7b which is formed in the suspension support panel 7, preferably, the bolt fitting holes 7c which are positioned in the longitudinal direction a of the vehicle are interposed between the first partition wall 130 and the second partition wall 140, from the longitudinal direction a of the vehicle. Black spots in FIG. 5 represent joining parts of the first partition wall 130 and the second partition wall 140 with respect to the upper frame 11.

A divisional part of the outer panel 111 which is positioned at the front side of the vehicle is called as a front outer panel 111A, and the other divisional part which is positioned at a rear side of the vehicle is called as a rear outer panel 111B. Moreover, the dividing part 120 of the outer panel 111 includes a rear end 111Ab of the front outer panel 111A, and a front end 111Ba of the rear outer panel 111B. In this embodiment, a center 111Aa of the front outer panel 111A is fixed to the second partition wall 140 by being fastened with bolts 136 which function as fastening members, as shown in FIG. 4. It is also possible to fix the front outer panel 111A to the second partition wall 140 by welding, without fastening them with the bolts 136. The rear outer panel 111B is fixed to the front pillar 9, by joining its rear end 111Bb to a lower end 9a of the front pillar 9 in the vertical direction by spot welding, as shown in FIG. 4. The front end 111Ba of the rear outer panel 111B is joined to the rear end 111Ab of the front outer panel 111A from outside in the lateral direction of the vehicle, and fastened together to the first partition wall 130 by means of a plurality of the bolts 135 to be fixed. In short, the rear end 111Ab of the front outer panel 111A and the front end 111Ba of the rear outer panel 111B are superposed on each other and are fixed to the first partition wall 130.

In this embodiment, the two partition walls, namely, the first partition wall 130 and the second partition wall 140 are provided inside the upper frame 11, and the first and second partition walls 130, 140 are joined to the side face 7a of the suspension support panel 7 which is positioned inward of the vehicle than the inner panel 110, byway of the inner panel 110. In case where a total length of the upper frame 11 is short, such an embodiment that only the first partition wall 130 is provided inside the upper frame 11 is also considered. In this case, the outer panel 111 may be divided at a position to be opposed to the first partition wall 130, and the relevant dividing part 120 may be fixed to the first partition wall 130 by fastening them with the bolts 135.

In this embodiment, the outer panel 111 has a dividable structure, and the front outer panel 111A and the rear outer panel 111B are set to have different wall thicknesses. In this embodiment, a wall thickness of the rear outer panel 111B which has the rear end 111Bb to be joined to the front pillar 9 subjected to the load in the vertical direction c of the vehicle from the front suspension 16 is set to be larger than a wall thickness of the front outer panel 111A. This is for the purpose of giving rigidity to the rear outer panel 111B which has the part subjected to the load.

According to the front part body structure of the vehicle as described above, the one end 10a of the upper frame 11 is joined to the front pillar 9, and the upper frame 11 has the closed sectional structure including the inner panel 110 and the outer panel 111. In this upper frame 11, the outer panel 111 is divided in the longitudinal direction a of the vehicle, and the dividing part 120 is fastened and fixed to the first partition wall 130 which is arranged between the inner panel 110 and the outer panel 111, by means of a plurality of the bolts 135. Therefore, due to such fixation of the dividing part 120, durability with respect to welding fixation is increased. For this reason, the spot welding can be applied to the joining part between the upper frame 11 and the front pillar 9, and hence, it is possible to stabilize maintenance of quality such as positional accuracy, while the fitting rigidity of the upper frame 11 is secured.

The outer panel 111 is divided into the front outer panel 111A and the rear outer panel 111B in the longitudinal direction a of the vehicle. Therefore, the front outer panel 111A which is positioned at the front side of the vehicle can be fixed, in advance, to the second partition wall 140 which is joined to the inner panel 110 joined to the suspension support panel 7, by fastening them with the bolts 136, and the rear end 111Bb of the rear outer panel 111B which is positioned at the rear side of the vehicle can be joined, in advance, to the front pillar 9. As the results, when the front part body structure of the vehicle which constitutes the engine room 2 having the suspension support panel 7 and the inner panel 110 is joined to the cabin side 1 having the front pillar 9, it is possible to form the upper frame 11 by fixing the dividing part 120 of the outer panel 111 to the first partition wall 130 which is integrally provided in the front part body structure of the vehicle, by fastening them with the bolts 135. In this manner, it is possible to reduce the number of working steps in production line, and to shorten assembling time. Moreover, because fixation of the dividing part 120 of the outer panel 111 is done by fastening with the bolts, the fitting rigidity of the upper frame 11 can be enhanced. Therefore, the upper frame 11 can be joined to the front pillar 9 by spot welding but not by arc welding, and in this respect too, reduction of the working time can be achieved.

Because the outer panel 111 has the dividable structure, it is possible to individually set the wall thickness of the front outer panel 111A and the wall thickness of the rear outer panel 111B. Therefore, in this embodiment, the wall thickness of the rear outer panel 111B which has the joining part with respect to the front pillar 9 subjected to the load inputted from the front suspension 16 can be made larger than the wall thickness of the front outer panel 111A. As the results, as compared with a case where the outer panel 111 is not divided, it is possible to achieve reduction of weight, while enhancing the rigidity of the rear outer panel 111B which has the joining part subjected to the load.

It is to be noted that the upper frame 10 which is positioned at the right side of the vehicle body has the same structure as the upper frame 11, and therefore, substantially the same effects as in the upper frame 11 can be obtained in the upper frame 10.

According to an aspect of the invention, the one end of the upper frame is joined to the front pillar which is positioned in the lateral direction of the vehicle, and the upper frame includes the inner panel and the outer panel. In this upper frame, the outer panel is divided in the longitudinal direction of the vehicle, and the dividing part is fastened and fixed to the first partition wall which is arranged between the inner panel and the outer panel in a manner joined to the inner panel, by means of the fastening members. Therefore, due to such fixation of the dividing part, durability with respect to welding fixation is increased. For this reason, it is possible to apply spot welding to the joining part between the upper frame and the front pillar, and hence, it is possible to stabilize maintenance of the quality such as positional accuracy, while the fitting rigidity of the upper frame is secured.

What is claimed is:

1. A front part body structure of a vehicle, comprising:
   an upper frame extending in a longitudinal direction of the vehicle, one end of which being joined to a front pillar, and including an inner panel and an outer panel, the outer panel being divided into a front outer panel and a rear outer panel at a dividing part in the outer panel; and
   a first partition wall provided separately from the outer panel and between the inner panel and the outer panel, one end of which being joined to the inner panel, and the other end of which being fastened and fixed to the dividing part of the outer panel by means of a fastening member,
   wherein the front outer panel, the rear outer panel, and the first partition wall overlap at the dividing part.

2. The front part body structure according to claim 1, further comprising:
   a second partition wall provided closer to a front end of the vehicle than the first partition wall, and one end of the second partition wall is joined to the inner panel, wherein
   the front outer panel is fixed to the second partition wall, and
   a rear end of the rear outer panel is joined to the front pillar, and a front end of the rear outer panel is joined to a rear end of the front outer panel and is fastened and fixed to the first partition wall by means of the fastening member.

3. The front part body structure according to claim 2, wherein the rear end of the front outer panel and the front end of the rear outer panel are fastened and fixed to the first partition wall by means of the fastening member.

4. The front part body structure according to claim 2, wherein at least one of the first partition wall and the second partition wall is joined to a suspension support panel positioned closer to a center line of the vehicle extending in the longitudinal direction of the vehicle than the inner panel and on which a suspension is mounted, through the inner panel.

5. The front part body structure according to claim 2, wherein a wall thickness of the rear outer panel is larger than a wall thickness of the front outer panel.

6. The front part body structure according to claim 2, wherein the first partition wall and the second partition wall are arranged at such positions that a strut fitting part which is formed in a suspension support panel is interposed between the first partition wall and the second partition wall in the longitudinal direction of the vehicle.

* * * * *